(12) United States Patent
Noda et al.

(10) Patent No.: US 11,338,545 B2
(45) Date of Patent: May 24, 2022

(54) LAMINATE AND METHOD OF PRODUCING SAME

(71) Applicants: National Institute of Advanced Industrial Science and Technology, Tokyo (JP); Arakawa Chemical Industries, Ltd., Osaka (JP)

(72) Inventors: Hiroaki Noda, Tsukuba (JP); Jun Akedo, Tsukuba (JP); Hideki Goda, Tsukuba (JP); Takeshi Fukuda, Osaka (JP); Haruhisa Togashi, Osaka (JP)

(73) Assignees: National Institute of Advanced Industrial Science and Technology, Tokyo (JP); Arakawa Chemical Industries, Ltd., Osaka (JP)

( * ) Notice: Subject to any disclaimer, the term of this patent is extended or adjusted under 35 U.S.C. 154(b) by 222 days.

(21) Appl. No.: 16/606,574

(22) PCT Filed: Apr. 17, 2018

(86) PCT No.: PCT/JP2018/015887
§ 371 (c)(1),
(2) Date: Oct. 18, 2019

(87) PCT Pub. No.: WO2018/194064
PCT Pub. Date: Oct. 25, 2018

(65) Prior Publication Data
US 2021/0114337 A1    Apr. 22, 2021

(30) Foreign Application Priority Data
Apr. 21, 2017    (JP) .............................. JP2017-084383

(51) Int. Cl.
*B32B 5/16* (2006.01)
*B32B 27/08* (2006.01)
(Continued)

(52) U.S. Cl.
CPC ................ *B32B 5/16* (2013.01); *B32B 27/08* (2013.01); *B32B 27/283* (2013.01);
(Continued)

(58) Field of Classification Search
CPC .. B32B 5/16; B32B 9/00; B32B 27/08; B32B 27/283; B32B 2264/105; B32B 2264/107;
(Continued)

(56) References Cited

U.S. PATENT DOCUMENTS

2006/0201419 A1    9/2006    Akedo
2006/0222862 A1    10/2006    Akedo
(Continued)

FOREIGN PATENT DOCUMENTS

CN    1104149    6/1995
CN    1409774    4/2003
(Continued)

OTHER PUBLICATIONS

Extended Search Report for EP18788210.5 dated Nov. 25, 2020.
(Continued)

*Primary Examiner* — Tri V Nguyen
(74) *Attorney, Agent, or Firm* — Christopher M. Scherer; DeWitt LLP (57) ABSTRACT

A laminate comprising a plastic substrate (A); a hardened organic polymer layer (B) provided on a surface of the plastic substrate (A) and having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244; an organic/inorganic composite layer (C) provided on a surface of the hardened organic polymer layer (B) and containing covalently bound organic polymer and metal oxide nanoparticles; and an inorganic layer (D) provided on
(Continued)

a surface of the organic/inorganic composite layer (C) and comprising secondary particles of ceramic or metal.

4 Claims, 1 Drawing Sheet (51) Int. Cl.
*B32B 27/28* (2006.01)
*B82Y 30/00* (2011.01)
*B82Y 40/00* (2011.01)

(52) U.S. Cl.
CPC ... *B32B 2264/105* (2013.01); *B32B 2264/107* (2013.01); *B32B 2264/301* (2020.08); *B32B 2264/302* (2020.08); *B32B 2307/536* (2013.01); *B32B 2383/00* (2013.01); *B82Y 30/00* (2013.01); *B82Y 40/00* (2013.01)

(58) Field of Classification Search
CPC ........ B32B 2264/301; B32B 2264/302; B32B 2307/536; B32B 2383/00; B82Y 30/00; B82Y 40/00; C23C 24/04; C09D 133/08; C09D 7/61; C09D 183/04; C09D 163/00; C08G 59/306; C08J 2369/00; C08J 2433/04; C08J 2463/00; C08J 2475/14; C08J 7/043; C08J 7/046
USPC .............................................. 428/425.9, 447
See application file for complete search history.

(56) References Cited

U.S. PATENT DOCUMENTS

| | | |
|---|---|---|
| 2008/0241556 A1 | 10/2008 | Akedo |
| 2010/0053101 A1 | 3/2010 | Nozawa et al. |
| 2010/0148389 A1 | 6/2010 | Akedo |
| 2013/0236738 A1 | 9/2013 | Yamauchi |
| 2014/0087176 A1 | 3/2014 | Zhao |
| 2014/0137938 A1* | 5/2014 | Takegami ............... B32B 27/08 136/256 |

FOREIGN PATENT DOCUMENTS

| | | | | |
|---|---|---|---|---|
| CN | 103282546 | | 2/2016 | |
| CN | 105934339 | | 9/2016 | |
| JP | 2005161703 | | 6/2005 | |
| JP | 2006175375 | | 7/2006 | |
| JP | 4118589 | | 7/2008 | |
| JP | 2010155409 A | * | 7/2010 | ............ B32B 27/00 |
| JP | 2010155892 | | 7/2010 | |
| JP | 2013159816 | | 8/2013 | |
| JP | 2014237302 A | * | 12/2014 | ............ B32B 27/00 |
| TW | 200946334 | | 11/2009 | |
| WO | WO-2015115227 A1 | * | 8/2015 | ............ B32B 27/00 |

OTHER PUBLICATIONS

Office Action dated Mar. 30, 2021, from the Chinese Patent Office for Chinese Application No. 201880026042.9.
National Institute of Advanced Industrial Science and Technology, "Application of ceramic film on plastic substrate at low temperature and low pressure", http://www.aist.go.jp/aist_j/press_release/pr2017/pr20170616_2/pr20170616_2.html, Jul. 2018.
International Preliminary Report on Patentability for PCT/JP2018/015887 dated Oct. 31, 2019.
"Coating ceramic film on plastic substrate at low temperature and low pressure", National Institute of Advanced Industrial Science and Technology, Jun. 16, 2017 (Jun. 16, 2017).

* cited by examiner

LAMINATE AND METHOD OF PRODUCING SAME

CROSS-REFERENCE TO RELATED APPLICATIONS

The present application is the U.S. national stage application of International Application No. PCT/JP2018/015887, filed Apr. 17, 2018, which international application was published on Oct. 25, 2018 as International Publication No. WO2018/194064. The International Application claims priority to Japanese Patent Application No. 2017-084383, filed Apr. 21, 2017, the contents of which are incorporated herein by reference in their entireties.

TECHNICAL FIELD

The present invention relates to a laminate and a method of producing same.

BACKGROUND ART

Recently, an aerosol deposition method is known as a new method of forming a film of ceramic or metal. When a mechanical impact force is applied to a brittle material, deviation and crushing of a crystal lattice occur. As a result, a new active surface with an unstable surface state is generated on a deviated surface or a crushed surface. A brittle material surface adjacent to this new active surface or its active surface, or a substrate surface are bonded. By repeating this phenomenon, the bonding proceeds, and densification and thickening of a film occur. A mechanism for forming a brittle material or the like on a plastic substrate by using the aerosol deposition method is such that injected particulate or fine fragmental particles crushed at collision pierce the substrate to form an anchor.

A method of forming an inorganic layer made of a hard material, a part of which is cut into the plastic substrate surface, using the above-mentioned aerosol deposition method has been reported (Patent Documents 1-2).

PRIOR ART DOCUMENT(S)

Patent Document(s)

Patent Document 1: JP 4118589 B
Patent Document 2: JP 2013-159816 A

SUMMARY OF THE INVENTION

Problem to be Solved by the Invention

However, in general when fine particles of a brittle material collide on the plastic substrate, there occur a phenomenon of no bonding being formed since (1) brittle material particles are repelled due to high elasticity of the plastic substrate or (2) the plastic substrate is chipped by impact of collision. Therefore, it is difficult to form an inorganic material such as a brittle material on a plastic with good adhesion to the plastic. In the case of the method described above, if the inorganic material is uniformly dispersed in an organic matrix, bonding between the organic matrix and the inorganic material is not sufficient. As a result, there occur a phenomenon such that by the impact of the collision or the like of fine particles, the bonding is lost, and cracks are generated.

The present invention has been made in view of such a conventional problem, and aims to provide a laminate being excellent in adhesion characteristic, density and transparency of films on a plastic substrate and a method of producing the laminate.

Means to Solve the Problem

As a result of intensive studies, the present inventors have found that for solving the above-mentioned problem, it is effective to form a hardened organic polymer layer (B) on an outermost layer of a plastic substrate (A); further form an organic/inorganic composite layer (C) on an outermost layer of the hardened organic polymer layer (B), in which the organic/inorganic composite layer (C) has complex covalent bonding of an organic polymer and nanoparticles of a metallic oxide; and form an inorganic layer (D) on an outermost layer of the organic/inorganic composite layer (C) by an aerosol deposition method, and have completed the present invention.

A laminate according to one embodiment of the present invention for solving the above problem is a laminate comprising a plastic substrate (A); a hardened organic polymer layer (B) provided on a surface of the plastic substrate (A) and having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244; an organic/inorganic composite layer (C) provided on a surface of the hardened organic polymer layer (B) and containing covalently bound organic polymer and nanoparticles of a metallic oxide; and an inorganic layer (D) provided on a surface of the organic/inorganic composite layer (C) and comprising secondary particles of ceramic or metal.

Further, a method of producing a laminate according to one embodiment of the present invention for solving the above-mentioned problem is a method of producing a laminate, in which the method comprises a step of forming, on a surface of a plastic substrate (A), a hardened organic polymer layer (B) having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244; a step of forming, on a surface of the hardened organic polymer layer (B), an organic/inorganic composite layer (C) containing covalently bound organic polymer and nanoparticles of a metallic oxide; and a step of forming, on the organic/inorganic composite layer (C), an inorganic layer (D) comprising secondary particles of ceramic or metal deposited by an aerosol deposition method.

Effects of the Invention

According to the present invention, a laminate being excellent in adhesion characteristic, density and transparency of films on a plastic substrate can be produced.

EMBODIMENT FOR CARRYING OUT THE INVENTION

<Laminate>

The laminate according to one embodiment of the present invention comprises a plastic substrate (A); a hardened organic polymer layer (B) provided on a surface of the plastic substrate (A) and having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244; an organic/inorganic composite layer (C) provided on a surface of the hardened organic polymer layer (B), in which an organic polymer and nanoparticles of a metallic oxide are subjected to covalent bonding; and an inorganic layer (D) provided on a surface of the organic/inorganic composite layer (C) and comprising deposited secondary particles of ceramic or metal.

Further, the method of producing a laminate according to one embodiment of the present invention comprises a step of forming, on a surface of a plastic substrate (A), a hardened organic polymer layer (B) having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244; a step of forming, on a surface of the hardened organic polymer layer (B), an organic/inorganic composite layer (C) containing covalently bound organic polymer and nanoparticles of a metallic oxide; and a step of forming, on the organic/inorganic composite layer (C), an inorganic layer (D) comprising secondary particles of ceramic or metal deposited by an aerosol deposition method.

The laminate and the method of producing the laminate according to one embodiment of the present invention will be described below with reference to the drawing.

(Plastic Substrate (A))

The plastic substrate (A) is not particularly limited as long as it is a molding or film molded using an organic polymer or resin, or a solution thereof. Examples of the plastic substrate (A) include polyolefin resins represented by polyethylene and polypropylene; thermoplastic polyester resins such as a polyethylene terephthalate resin, a polybutylene terephthalate (PBT) resin, a polycarbonate (PC) resin and a polycarbonate-polybutylene terephthalate (PC/PBT) resin; styrene resins such as an acrylonitrile-styrene resin, an acrylonitrile-butadiene-styrene (ABS) resin and an acrylonitrile-styrene-acrylate (ASA) resin; heat-resistant resins such as A polymethyl methacrylate resin, an acrylic resin, vinyl chloride, vinylidene chloride, a polyamide resin, a polyphenylene ether resin, a polyoxymethylene resin, a polyurethane resin, an epoxy resin, polyimide, polyamide-imide and Teflon (registered trademark); composite resins such as fiber-reinforced plastics; cellulose such as triacetyl cellulose; rubbers such as urethane rubber, butadiene rubber, styrene-butadiene rubber, acrylic rubber, isoprene rubber and fluorine-containing rubbers; and the like. These may be used in combination.

(Hardened Organic Polymer Layer (B))

When forming a film using an inorganic material described later by an aerosol deposition method, a shrinkage stress is generated in the inorganic layer formed by the method after the film formation. When the substrate is a rigid inorganic material such as a glass substrate or the like, if the adhesion is sufficient, the stress can be kept while being held in the inorganic layer due to high toughness of the substrate itself. On the other hand, when the substrate is made of plastic, the plastic has neither adhesion strength nor fracture toughness enough to hold the stress. Therefore, there often occur defects such that the inorganic layer is peeled off from the substrate due to shrinkage stress, cracks are generated in the inorganic layer, and a dense inorganic layer is not formed.

There is a method of relaxing the stress generated during the inorganic layer formation as a means for eliminating the above defects. In the embodiment of the present invention, the hardened organic polymer layer (B) functions to relax the stress. Therefore, the stress generated during the film formation is relaxed.

Thus, the storage elastic modulus and tan δ of the hardened organic polymer layer (B) are not particularly limited if the stress generated during the inorganic layer formation is relaxed. An upper limit of the storage elastic modulus of the hardened organic polymer layer (B) is 5, 4, 3, 2, 1, 0.5, 0.1, 0.05, 0.02 GPa or the like. A lower limit of the storage elastic modulus is 4, 3, 2, 1, 0.5, 0.1, 0.05, 0.02, 0.01 GPa or the like. An upper limit of tan δ is 2.0, 1.5, 1.0, 0.5, 0.2 or the like. A lower limit of tan δ is 1.9, 1.5, 1.0, 0.5, 0.2, 0.1 or the like. From the viewpoint of forming a dense inorganic layer (D) and alleviating the stress sufficiently, it is preferable that the hardened organic polymer layer (B) has a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244. The ranges of the storage elastic modulus and tan δ can be set appropriately (e.g., by selecting from the values of the upper and lower limits mentioned above). In this embodiment of the present invention, the dynamic viscoelasticity test is carried out by performing the dynamic viscoelasticity measurement under measurement conditions of a measurement start temperature of −60° C., a measurement end temperature of 100° C., a temperature elevating rate of 2° C./min, and a measurement frequency of 10 Hz in accordance with the test method stipulated in JIS K 7244 using a device DMS-6100 (seller: Seiko Instruments Inc.).

Example of such a method of forming a hardened organic polymer layer (B) includes a method of applying an organic polymer (b) solution on the plastic substrate (A), drying the solvent, and curing as needed. The organic polymer (b) is not particularly limited as long as the storage elastic modulus and tan δ of the hardened organic polymer layer (B) are within the range described above. The organic polymer (b) is appropriately selected in consideration of adhesion to the plastic substrate (A). Examples of the organic polymer (b) include a thermoplastic elastomer, a thermosetting resin, a photocurable resin and the like.

The thermoplastic elastomer is not particularly limited. Examples of the thermoplastic elastomers include fluorine-containing elastomers, polystyrene elastomers, polyolefin elastomers, polyvinyl chloride elastomers, polyurethane elastomers, polyamide elastomers, polyester elastomers and the like. These may be used in combination.

The thermosetting resin is not particularly limited. Examples of the thermosetting resin include an epoxy resin having an epoxy group to be cured with an acid or a base, an isocyanate-curable resin having a hydroxyl group to be cured with an isocyanate, a melamine-curable resin having a hydroxyl group to be cured with melamine, an amine-curable resin having a carbonyl group to be cured with an amine, a sol-gel-curable silicone resin and the like. These may be used in combination.

The photocurable resin is not particularly limited. Examples thereof include a photo-curable resin obtained by curing (meth)acrylic ester, urethane (meth)acrylate, polyester (meth)acrylate, epoxy (meth)acrylate or polyacryl (meth) acrylate (e.g., "beam set series" available from Arakawa Chemical Industries, Ltd.) with an active radical, photocurable resins obtained by curing epoxide, oxetane or vinyl ether with cation or anion and the like. These may be used in combination.

The organic polymer (b), among those mentioned above, is preferably a photocurable resin in consideration of interlayer adhesion to the plastic substrate (A) and organic-inorganic composite layer (C), stress relaxation properties and productivity. The organic polymer (b) is preferably a photocurable resin cured with an active radical, especially from a high degree of freedom of material selection.

These photocurable resins may be usually used together with a known photopolymerization initiator. The photopolymerization initiator is not particularly limited. A known photoradical initiator, photocationic initiator, photoanion initiator or the like is appropriately selected as the photopolymerization initiator. Examples of commercially available photoradical initiators include Omnirad73, Omnirad481, Omnirad659, Omnirad4817, OmniradTPO, OmniradBDK, OmniradMBF and OmniradBP (available from IGM) and the like. Examples of commercially available photocationic initiators include CYRACURE UVI-6970, CYRACURE UVI-6974 and CYRACURE UVI-6990 (available from DOW Chemical Company), IRGACURE 264, IRGACURE 270 and IRGACURE 290 (manufactured by BASF), CIT-1682 (available from Nippon Soda Co., Ltd.) and the like. Examples of commercially available photoanion initiators include WPBG-018, WPBG-140, WPBG-165, WPBG-266 and WPBG-300 (manufactured by Wako Pure Chemical Industries, Ltd.) and the like. An amount of the photopolymerization initiator is preferably about 1 to 10 wt % relative to 100 wt % of the hardened organic polymer layer (B). In case where the hardened organic polymer layer (B) is formed into a thick film, it is preferable to improve photocurability by adding a photosensitizer.

A solvent for dissolving the organic polymer (b) is not particularly limited. The solvent may be selected from known solvents in consideration of solubility of the organic polymer (b) and solvent resistance of the plastic substrate. Examples of the solvents include ethanol, n-propanol, isopropanol, n-butanol, isobutanol, acetone, methyl ethyl ketone, methyl isobutyl ketone, cyclohexanone, toluene, xylene, ethyl acetate, butyl acetate, cyclohexyl acetate, methoxypropanol, methoxypropyl acetate, 3-methoxybutanol, 3-methoxybutyl acetate, ethylene glycol monomethyl ether acetate, ethylene glycol dimethyl ether, ethylene glycol monoethyl ether, ethylene glycol monobutyl ether, ethylene glycol monoethyl ether acetate, ethylene glycol monobutyl ether acetate, diethylene glycol monomethyl ether, diethylene glycol monomethyl ether acetate, diethylene glycol monoethyl ether, diethylene glycol monobutyl ether and the like. These may be used in combination.

The hardened organic polymer layer (B) may include known fillers. For introducing the fillers, a method of dispersing known fillers in the organic polymer (b) solution, a method of mixing a solvent called colloidal silica or organosilica sol, in which fine silica is dispersed, or other method is used. An average particle size of the filler is preferably 200 nm or less, more preferably 100 nm or less from the viewpoint of optical properties. The average particle size can be obtained as a median diameter (d50) in a particle size distribution obtained by a dynamic light scattering method or a laser diffraction scattering method, and in addition, it can be calculated by the average value or the like observed with an electron microscope or the like. A content of the fillers is not particularly limited if it meets the specified conditions. For example, the content of the fillers is preferably about 150 wt % or less relative to 100 wt % of the hardened organic polymer layer (B), from the viewpoint that moderate brittleness is imparted and a stress tends to be relaxed. A surface treatment method of the filler is not particularly limited. The surface treatment method may be selected appropriatly from the viewpoint of dispersion in the organic polymer (b) solution.

The hardened organic polymer layer (B) may comprise, within a range that does not impair the conditions specified above, additives such as plasticizers, weathering agents, antioxidants, thermal stabilizers, flame retardants, heat insulating agents, antistatic agents, antifoaming agents, whitening agents, coloring agents, fillers and the like.

A known method of forming a thin film is used as a coating method of the hardened organic polymer layer (B). A wet coating method is particularly preferable as a coating method. Examples of such a coating method include known coating methods (coating devices) such as spin coating, dip coating, roll coating, spray coating, gravure coating, wire bar coating, air knife coating and curtain coating.

Examples of a method of curing the hardened organic polymer layer (B) after drying include thermosetting, photocuring, and the like. A curing method is preferably carried out according to kind of the organic polymer (b). The curing of the hardened organic polymer layer (B) may be performed after the coating of the organic-inorganic composite layer (C).

In the case of thermosetting, a hardened coating film can be formed by heating usually at about 60° to 150° C. for about 3 to 180 minutes.

In the case of photocuring, a hardened coating film can be formed usually by irradiation of activation energy ray after evaporation of a solvent. A method of evaporation of a solvent may be appropriately determined depending on kind and amount of a solvent, a coating thickness, heat resistance of a substrate and the like. For example, evaporating condition is heating to about 40° to 150° C. for five seconds to two hours under normal or reduced pressure. Examples of activation energy ray include ultraviolet ray, electron beam and the like. Examples of ultraviolet light sources include an ultraviolet ray irradiation device having a xenon lamp, a high pressure mercury lamp or a metal halide lamp. A radiation dose of activation energy rays is not limited particularly. The radiation dose may be appropriately determined depending on kind of a compound to be used for the hardened organic polymer layer (B), a coating thickness and the like. For example, in the case of ultraviolet ray curing using a high pressure mercury lamp, a radiation dose is one for providing an integrated quantity of light of about 50 to 2,000 mJ/cm$^2$. Further, in the case of a thicker coating film, the above-mentioned photosensitizer is added suitably.

The coating thickness of the hardened organic polymer layer (B) in the present embodiment is not limited particularly. For example, the coating thickness is usually about 5 to 100 μm.

(Organic/Inorganic Composite Layer (C))

The organic-inorganic composite layer (C) according to the embodiment of the present invention has a structure comprising an organic polymer as a matrix with metal oxide nanoparticles being dispersed therein, and made of a material having a covalent bond between the metal oxide nanoparticles surface and the organic polymer. An average particle size of the metal oxide nanoparticles is preferably 50 nm or less since adhesion to the inorganic layer (D) formed by the aerosol deposition method is excellent and the inorganic layer is easily formed without cracks.

In the organic/inorganic composite layer (C) according to the embodiment of the present invention, the organic polymer and the metal oxide nanoparticles have a covalent bond. A method of forming the organic/inorganic composite layer (C) comprises:

(I) a step of applying and curing a solution comprising a silane-modified polymer (c1), (II) a step of curing a reactive silsesquioxane compound (c2), (III) a step of applying and curing surface-reactive metal oxide nanoparticles (c3) and a photocurable resin (c4).

Among these steps, either one step may be performed, or a plurality of steps may be performed.

(A Step of Applying and Curing a Solution Comprising the Silane-Modified Polymer (c1) (Also Referred to as a Step c1))

In the step c1, a silane-modified polymer (c1) obtained by introducing alkoxysilane to an organic polymer and a resin by a chemical reaction is used. For the introduction of the alkoxysilane, a conventionally known method such as a method of covalently bonding alkoxysilane as it is, a method of covalently bonding previously condensed alkoxysilane, or a method of using a silane coupling agent may be suitably selected depending on kind of the organic polymer or the resin. In any of the methods, silica particles covalently bonded to the organic polymer can be obtained by curing the alkoxysilane by way of a sol-gel reaction. Among them, a method of subjecting alkoxysilane to condensation previously and then covalently bonding is preferable since a particle size of the resulting silica particles is easily controlled, and silica particles having a desired particle size is easily obtained. A preparation method of a silane-modified polymer by covalently bonding an alkoxysilane oligomer to an organic polymer or a resin is not particularly limited. For example, the silane-modified polymer may be prepared by the method described in reference patent publications such as JP 2001-059011 A, JP 2004-300238 A, JP 2004-269793 A and JP 2000-281756 A.

Examples of commercially available silane-modified polymer (c1) include COMPOCERAN E (silane-modified epoxy resin), COMPOCERAN H (silane-modified polyimide, silane-modified polyamide-imide), COMPOCERAN P (silane-modified phenol resin), COMPOCERAN AC (silane-modified acrylic polymer), UREARNO U (silane-modified urethane resin) and the like available from Arakawa Chemical Industries, Ltd. Among these, the silane-modified epoxy resin is preferable as the silane-modified polymer (c1) since adhesion to the inorganic layer (D) is particularly good.

For the solution including a silane-modified epoxy resin as the silane-modified polymer (c1), a known curing agent for an epoxy resin is used. For low temperature curing of an epoxy resin and a curing agent for an epoxy resin, an epoxy resin curing catalyst may be used in combination.

A phenol resin-based curing agent, a polyamine-based curing agent, a polycarboxylic acid-based curing agent, an imidazole-based curing agent or the like which is usually used as a curing agent for an epoxy resin can be used without limitation for a solution including an epoxy resin. Specifically, examples of the phenol resin-based curing agent include a phenol novolac resin, a bisphenol novolac resin, poly p-vinylphenol and the like. Examples of the polyamine-based curing agents include diethylenetriamine, triethylenetetramine, tetraethylenepentamine, dicyandiamide, polyamideamine (polyamide resin), ketimine compounds, isophoronediamine, m-xylenediamine, m-phenylenediamine, 1,3-bis(aminomethyl)cyclohexane, N-aminoethylpiperazine, 4,4'-diaminodiphenylmethane, 4,4'-diamino-3, 3'-diethyl-diphenylmethane, diaminodiphenyl sulfone, dicyandiamide, and the like. Examples of the polycarboxylic acid-based curing agents include phthalic anhydride, tetrahydrophthalic anhydride, methyl tetrahydrophthalic anhydride, 3,6-endomethylene tetrahydrophthalic anhydride, hexa-chloro endomethylene tetrahydrophthalic anhydride, methyl-3,6-endomethylene tetrahydrophthalic anhydride and the like. Examples of the imidazole-based curing agent include 2-methylimidazole, 2-ethylhexylimidazole, 2-undecylimidazole, 2-phenylimidazole, 1-cyanoethyl-2-phenylimidazolium.trimellitate, 2-phenylimidazolium-isocyanurate. These may be used in combination.

Conventionally known epoxy resin curing catalysts may be used as the epoxy resin curing catalyst. When performing curing with a phenol resin-based curing agent or a polycarboxylic acid-based curing agent, examples of the epoxy resin curing catalyst include tertiary amines such as 1,8-diaza-bicyclo[5.4.0]-7-undecene, triethylenediamine, benzyldimethylamine, triethanolamine, dimethylaminoethanol and tris(dimethylaminomethyl)phenol; imidazoles such as 2-methylimidazole, 2-phenylimidazole, 2-phenyl-4-methylimidazole and 2-heptadecylimidazole; organic phosphines such as tributylphosphine, methyldiphenylphosphine, triphenylphosphine, diphenylphosphine and phenylphosphine; tetraphenylboratessuchastetraphenylphosphonium-tetraphenylborate, 2-ethyl-4-methylimidazole-tetraphenylborate and N-methylmorpholine-tetraphenylborate and the like. These may be used in combination.

In the step c1, a catalyst for accelerating the sol-gel reaction may be used separately. Examples of the catalyst for the sol-gel reaction include conventionally known ones such as an acid or basic catalyst and metal catalysts. Specifically, examples of the acid catalyst include p-toluenesulfonic acid, trifluoroacetic acid and the like. Examples of the basic catalyst include tertiary amines such as 8-diaza-bicyclo [5.4.01]-7-undecene, triethylenediamine, benzyldimethylamine, triethanolamine, dimethylaminoethanol and tris(dimethylaminomethyl)phenol; imidazoles such as 2-methylimidazole, 2-phenylimidazole, 2-phenyl-4-methylimidazole and 2-heptadecylimidazole; and the like. Examples of the metal catalysts include tin octylate, dibutyltin dilaurate, diisopropoxybis(ethylacetoacetate)titanium, titanium acetylacetonate, zirconium tetra acetylacetonate, and the like. These may be used in combination. In addition, among the epoxy resin curing agents listed above, polyamine-based curing agents and imidazole-based curing agents also serve as a catalyst for accelerating the sol-gel reaction.

The solution including the silane-modified polymer (c1) may include the same known fillers as in the hardened organic polymer layer (B). Examples of the fillers include ceramic particles such as alumina, silica, titanium oxide, zinc oxide, tin oxide and the like. Further, the solution may be one including minerals such as talc, mica or wollastonite dispersed therein other than the ceramic particles.

The surfaces of the ceramic particles and minerals react with an alkoxy silane moiety of the silane-modified polymer (c1) during the curing to form a covalent bond.

The method of applying and curing the solution including the silane-modified polymer (c1) to obtain the organic-inorganic composite layer (C) is not particularly limited. The method of obtaining the organic-inorganic composite layer (C) may be appropriately selected according to the silane-modified polymer (c1) to be used. Upon curing, an alkoxysilane moiety of the silane-modified polymer is subject to hydrolysis and condensation reaction to form a higher siloxane bond and give silica. In the case of using the silane-modified polymer obtained by covalently coupling the alkoxysilane oligomer with the organic polymer or resin, curing can be conducted by the methods described in the reference patent publications mentioned above in connection with the preparation method of the silane-modified polymer. The organic-inorganic composite layer (C) obtained using the silane-modified epoxy resin out of the silane-modified polymers (c1) is preferred because of its excellent adhesion to the inorganic layer (D) and transparency.

(A Step of Curing the Reactive Silsesquioxane Compound (c2) (Also Referred to as a Step c2))

In the step c2, the silsesquioxane (c2) having a light- or heat-curable functional group is used. The functional group of the reactive silsesquioxane (c2) is not particularly limited. Examples of the functional group include an epoxy group, a thiol group, an acryl group, a methacryl group, a vinyl group, an oxetanyl group, an amino group, an alkoxy group, a hydrosilyl group and the like. A method of preparing the reactive silsesquioxane (c2) is not particularly limited. For example, the reactive silsesquioxane (c2) may be prepared by methods described in reference patent publications such as JP 2007-217673 A, JP 2007-291313 A and JP 2009-108109 A.

Examples of commercially available reactive silsesquioxane (c2) include Compoceran SQ500 (silsesquioxane compound having an epoxy group) and Compoceran SQ100 (silsesquioxane compound having a thiol group) available from Arakawa Chemical Industries, Ltd., AC-SQ (silsesquioxane compound having an acrylic group), MAC-SQ (silsesquioxane compound having a methacryl group) and OX-SQ (silsesquioxane compound having an oxetanyl group) available from Toagosei Co., Ltd. and the like.

In the method of obtaining the organic-inorganic composite layer (C) by applying and curing a solution including the reactive silsesquioxane (c2), the reactive silsesquioxane solution containing the (c2) may be selected appropriately depending on the functional group thereof. The organic-inorganic composite layer (C) obtained from a silsesquioxane compound having a thiol group among the reactive silsesquioxanes (c2) is preferred because adhesion to the hardened organic polymer layer (B) and the inorganic layer (D) and transparency are excellent. The silsesquioxane compound having a thiol group can be cured by methods described in the reference patent publications mentioned above in connection with the preparation method of the reactive silsesquioxane (c2).

Known curing agents capable of reacting with a thiol group can be used for a solution including the silsesquioxane compound having a thiol group as the reactive silsesquioxane (c2).

When curing a silsesquioxane compound having a thiol group by ultraviolet rays, a conventionally known compound having a carbon-carbon double bond may be used appropriately. Examples of a functional group having a carbon-carbon double bond include a vinyl group, an acryl group, a methacryl group, an allyl group and the like. Of these, a functional group having a low radical polymerizability, for example, one having an allyl group is preferred from the viewpoint that a reaction tends to occur between the functional group having a carbon-carbon double bond and a thiol group.

Further, a polymerization initiator is used as required. The polymerization initiator is not particularly limited. For example, a known photo-radical initiator, photocationic initiator, optical anionic initiator or the like is appropriately selected. Examples of commercially available photoradical initiators, photocationic initiators and photoanionic initiators are those described above with reference to the photocurable resin.

(Step of Applying and Curing Surface-Reactive Metal Oxide Nanoparticles (c3) and a Photocurable Resin (c4) (Also Referred to as a Step c3))

In the step c3, the surface-reactive metal oxide nanoparticles (c3) and the photocurable resin (c4) are used. The surface-reactive metal oxide nanoparticles (c3) are not particularly limited. Examples of the surface-reactive metal oxide nanoparticles (c3) include nanoparticles of silicon oxide (silica), zirconium oxide, titanium oxide, aluminum oxide, zinc oxide, niobium oxide, indium oxide, tin oxide, cerium oxide, antimony oxide, molybdenum oxide and the like. From the viewpoint of excellent reactivity during the surface treatment, particularly silica nanoparticles are preferred as the surface-reactive metal oxide nanoparticles (c3). The surface-reactive metal oxide nanoparticles (c3) may be used in combination.

Examples of compounds having a reactive group and used for the surface treatment of the surface-reactive metal oxide nanoparticles (c3) include silane compounds such as vinyltrimethoxysilane, allyltrimethoxysilane, γ-methacryloxypropyltrimethoxysilane, γ-(meth)acryloxypropyltriethoxysilane, γ-glycidoxypropyltrimethoxysilane, γ-glycidoxypropyltriethoxysilane, γ-mercaptopropyltrimethoxysilane, γ-aminopropyltrimethoxysilane, γ-aminopropyltriethoxysilane, γ-isocyanatepropyltrimethoxysilane and γ-isocyanatepropyltriethoxysilane. These compounds may be selected appropriately according to kind of the photocurable resin (c4). These compounds may be used in combination. Especially when a curing system by active radicals is selected, surface treatment with a compound having a (meth)acryloyl group is preferable.

A method of preparing silica nanoparticles surface-modified with a compound having a (meth)acryloyl group is not particularly limited. For example, the preparation method is a method of subjecting the silica particles dispersed in a solvent and the compound having a (meth)acryloyl group to hydrolytic condensation reaction. Further, a preparation method of silica nanoparticles surface-modified with a compound having a (meth)acryloyl group is well-known, and is described in, for example, JP 2006-24932 A, JP 3900506 B and the like.

An average particle size of the silica nanoparticles surface-modified with a compound having a (meth)acryloyl group is preferably 4 to 50 nm from the viewpoint of dispersibility of the nanoparticles, adhesion to the inorganic layer (D) and transparency of a coating film.

The surface-reactive metal oxide nanoparticles surface-modified with a compound having a (meth)acryloyl group and meeting the above-mentioned conditions may be those commercially available. Example of commercially available ones include MEK-AC-2140Z, MEK-AC-4130Y, PGM-AC2140Y, PGM-AC-4130Y, MIBK-SD, MIBK-SD-L, etc. manufactured by Nissan Chemical Corporation. These may be used in combination.

A content of the surface-reactive metal oxide nanoparticles (c3) is not particularly limited. The content of the surface-reactive metal oxide nanoparticles (c3) is preferably 20 to 80 vol %, more preferably 40 to 60 vol % based on the total volume of the surface-reactive metal oxide nanoparticles (c3) and the photocurable resin (c4), from the viewpoint of adhesion to the inorganic layer (D) and handling of a coating film.

The photocurable resins, etc. mentioned above in connection with the hardened organic polymer layer (B) can be used as the photocurable resin (c4). Among them, from the viewpoint of storage stability when the surface-reactive metal oxide nanoparticles (c3) are compounded, a photocurable resin cured with active radicals are preferred as the photocurable resin (c4).

The method of applying and photocuring surface-reactive metal oxide nanoparticles (c3) and the photocurable resin (c4) in the step (III) is not particularly limited. The same applying method and curing method as in the above-mentioned hardened organic polymer layer (B) may be used as the photocuring method.

Further, a thickness of the organic-inorganic composite layer (C) is not particularly limited. For example, the thickness is preferably about 1 to 20 μm, more preferably about 3 to 10 μm usually from the viewpoint of adhesion and formation of each layer.

A silicon content in the organic-inorganic composite layer (C) is preferably 20 to 80 vol %, more preferably 20 to 30 vol % based on the total volume of the organic-inorganic composite layer.

(Inorganic Layer (D))

The inorganic layer (D) obtained by depositing secondary particles of ceramic or metal is formed by an aerosol deposition method. In the embodiment according to the present invention, the "secondary particles" refers to particles entering in or bonding to the organic-inorganic composite layer when spraying particles of a ceramic or metal to deposit the inorganic layer.

An inorganic material forming the inorganic layer (D) is not particularly limited. Examples of the inorganic material include metal oxide ceramics such as alumina, zirconia, barium titanate, lead zirconate titanate, titanium oxide, zinc oxide, yttria and silica; non-oxide ceramics such as aluminum nitride, silicon nitride and carbon nitride; metals and intermetallic compounds of Al, Mg, Fe, etc.; and the like. These inorganic materials form the inorganic layer (D) by aerosol deposition method.

Figure 1:
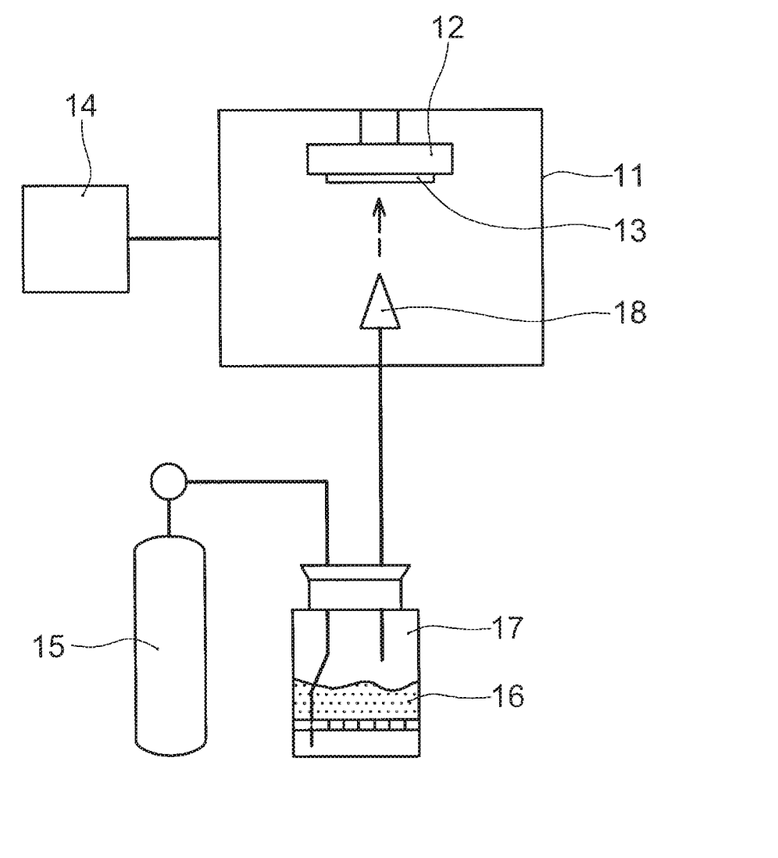
FIG. 1 is a schematic diagram for explaining an aerosol deposition method.

FIG. 1 is a schematic diagram for explaining an aerosol deposition method (AD method). Inside a chamber 11, a base 12 is installed, and a laminate 13 is disposed on the base 12. A pressure inside the chamber 11 can be controlled under reduced pressure by means of a rotary pump 14. An inorganic material 16 is formed into an aerosol by a carrying gas supplied from a gas cylinder 15 inside the aerosol generator 17. In the embodiment according to the present invention, the aerosol refers to a mixture of particulate, ultrafine particle powder and a gas in a solid phase-gas phase mixed state. The inorganic material formed into an aerosol is injected toward the laminate 13 from a nozzle 18 disposed inside the chamber 11. The injected inorganic material 16 is subjected to plastic deformation and deposition on the surface of the laminate 13. Accordingly, the inorganic layer (D) is formed.

In the AD method, an impinging speed of the inorganic material 16 onto the laminate 13 is not particularly limited. For example, the impinging speed is 100 to 600 m/s. It should be noted that the impinging speed can be measured by the method described in M. Lebedev et al., "Simple self-selective method of velocity measurement for particles in impact-based deposition", J. Vac. Sci. Technol. A 18 (2), 563-566 (2000). Specifically, measurement is made using an impinging speed meter, and a maximum speed $V_{max}$ and a minimum speed $V_{min}$ can be calculated from the following formulas.

$$V_{max} = \frac{WL}{d_1 + \frac{\delta}{2} + L \times \sin(\alpha)}$$

$$V_{min} = \frac{WL}{d_2 - \frac{\delta}{2} - L \times \sin(\alpha)}$$

$$W = r\omega (m/s)$$

$$\omega = 2\pi/T$$

In the formulas, r is a radius of rotation of the nozzle, T is a rotation period of the nozzle, δ is a slit width, L is a distance between the slit and the substrate, α is a spreading angle of the aerosol, $d_1$ is a position of the inorganic material 16 impinged first through a slit on the laminate 13, $d_2$ is a position of the inorganic material 16 impinged latest through the slit on the laminate 13, W is a speed in a horizontal direction.

A pressure inside the chamber during the film formation by the AD method is not particularly limited. For example, the pressure inside the chamber is preferably 1 Pa or more, more preferably 10 Pa or more. On the other hand, the pressure inside the chamber is preferably 50 kPa or less, more preferably 1 kPa or less.

Kind of the carrier gas in the AD method is not particularly limited. Examples of the carrier gas include inert gases such as helium (He), argon (Ar) and nitrogen ($N_2$), dry air and the like. A gas flow rate of the carrier gas is not particularly limited as long as the flow rate is one being capable of maintaining a desired aerosol. For example, a gas flow rate in a 500 mL aerosol container is within a range of 1 to 20 liter/min.

By using the above method, in the case of forming an inorganic layer on a thick plastic substrate from which a stress is hardly relaxed, it is possible to suppress generation and growth of cracks.

Further, by using the above method, not only adhesion to a substrate is enhanced, but also a dense film can be formed, resulting in improved permeability of the formed film. In particular, according to the above method, 5% or less of a haze value as an optical transmittance can be achieved.

Further, by using the above method, a density of the film can be improved to achieve a density of 95% or more.

On the other hand, the AD method makes it possible to form not only a dense film but also a porous film. For example, according to the AD method, a film having a density of 80% or less can be formed.

Further, by the AD method, it is possible to form a strong inorganic layer, and the laminate can have a Vickers hardness of 100 Hv or more and a critical film breaking load of 30 mN or more in a scratch test.

One embodiment of the present invention was described above. The present invention is not particularly limited to the above embodiment. The embodiment described above is intended to mainly explain the invention having the following configurations.

(1) A laminate comprising a plastic substrate (A); a hardened organic polymer layer (B) provided on a surface of the plastic substrate (A) and having a storage elastic modulus of from 0.01 to 5 GPa and tan δ of from 0.1 to 2.0 at 25° C. which are measured at a temperature elevating rate of 2°

C./min by a dynamic viscoelasticity test stipulated in JIS K 7244; an organic/inorganic composite layer (C) provided on a surface of the hardened organic polymer layer (B) and containing covalently bound organic polymer and metal oxide nanoparticles; and an inorganic layer (D) provided on a surface of the organic/inorganic composite layer (C) and comprising secondary particles of ceramic or metal.

(2) The laminate of above (1), wherein the hardened organic polymer layer (B) comprises a hardened photocurable resin.

(3) A method of producing a laminate, the method comprising: a step of forming, on a surface of a plastic substrate (A), a hardened organic polymer layer (B) having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K 7244, a step of forming, on a surface of the hardened organic polymer layer (B), an organic/inorganic composite layer (C) containing covalently bound organic polymer and metal oxide nanoparticles, and a step of forming, on the organic/inorganic composite layer (C), an inorganic layer (D) comprising secondary particles of ceramic or metal deposited by an aerosol deposition method.

(4) The method of producing a laminate of above (3), wherein the step of forming the organic/inorganic composite layer (C) comprises at least one of the following steps (I) to (III):

(I) a step of applying and curing a solution comprising a silane-modified polymer (c1), (II) a step of applying and curing a reactive silsesquioxane compound (c2), and (III) a step of applying and curing surface-reactive metal oxide nanoparticles (c3) and a photocurable resin (c4).

EXAMPLE

The present invention will be explained below more specifically by showing Examples and Comparative Examples in the following. The present invention is not limited to these Examples. In each Example and Comparative Example, "parts" and "%" show parts by weight and vol % unless otherwise specified.

Example 1

(Formation of Hardened Organic Polymer Layer (B))

A coating was prepared by adding 4.5 g of methyl ethyl ketone, 11.4 g of propylene glycol monomethyl ether and 12.6 g of nano silica dispersion in an organic solvent PGM-2140Y (particle size: 10 to 15 nm, available from NISSAN CHEMICAL CORPORATION) to 9.0 g of an acrylic ultraviolet-curable coating XSR-5N (a mixture of polyfunctional urethane acrylate, acrylic ester and a photopolymerization initiator available from Arakawa Chemical Industries, Ltd.) and then sufficiently stirring the mixture. This coating was applied to a polycarbonate sheet (A1) (available from Teijin Limited, thickness: 2 mm) using a wire bar, followed by drying at 80° C. for 90 seconds and then irradiation of ultraviolet ray of 50 mJ/cm² to obtain a laminate (B1) coated with about 10 μm temporarily-cured hardened organic polymer layer (B). A storage elastic modulus at 25° C. of a film alone obtained from this coating was 3.2 GPa and tan δ thereof was 0.14. These values were calculated using a device DMS-6100 (seller: Seiko Instruments Inc.) by measuring a dynamic viscoelasticity under measurement conditions of a measurement start temperature of −60° C., a measurement end temperature of 100° C., a temperature elevating rate of 2° C./minute and a measurement frequency of 10 Hz in accordance with the test method stipulated in JIS K 7244.

(Formation of Organic/Inorganic Composite Layer (C))

A silane-modified epoxy resin "COMPOCERAN E102B" (available from Arakawa Chemical Industries, Ltd.) was used as the silane-modified polymer (c1). To 48.7 g COMPOCERAN E102B were added 4.6 g of acid anhydride curing agent "RIKACID MH-700" (available from New Nippon Chemical Co., Ltd.), 0.6 g of a curing catalyst "CUREZOL 2E4MZ" (available from SHIKOKU CHEMICAL CORPORATION) and 46.1 g of methyl ethyl ketone, followed by stirring sufficiently to prepare a coating. This coating was applied to the obtained laminate (B1) using a wire bar, followed by drying at 80° C. for 90 seconds, curing at 120° C. for 30 minutes and then irradiating ultraviolet rays of 600 mJ/cm² to obtain a laminate (C1) having an about 3 μm organic/inorganic composite layer (C) formed thereon.

(Formation of Inorganic Layer (D))

An aerosol deposition (AD) device shown in FIG. 1 and having a usual construction and provided with a film formation chamber, an aerosol chamber, a vacuum pump and a carrier gas generator was used. Further, for formation of the inorganic layer (D), aluminum oxide powder was used. The powder was subjected to drying treatment at 120° C. to 250° C. as treatment before the film formation, and an inorganic material layer was formed at room temperature using the dried aluminum oxide powder to prepare a sample. In the film formation, dry air was introduced into the aerosol chamber at a flow rate of 3 to 5 liter/min to generate aerosol in which aluminum oxide fine particles (secondary particles) were dispersed. A laminate (D1) was obtained on the laminated layers by an AD method under the above-mentioned conditions.

Example 2

(Formation of Hardened Organic Polymer Layer (B))

A coating was prepared by adding 4.5 g of methyl ethyl ketone, 11.4 g of propylene glycol monomethyl ether and 12.6 g of nano silica dispersion in an organic solvent PGM-2140Y (particle size: 10 to 15 nm, available from NISSAN CHEMICAL CORPORATION) to 9.0 g of acrylic ultraviolet-curable coating XSR-5N (available from Arakawa Chemical Industries, Ltd.) and then sufficiently stirring the mixture. This coating was applied to a polycarbonate sheet (A1) (available from Teijin Limited, thickness: 2 mm) using a wire bar, followed by drying at 80° C. for 90 seconds and then irradiation of ultraviolet ray of 50 mJ/cm², thereby semi-curing the coating to obtain a laminate (B2) provided with an about 10 μm coating. A storage elastic modulus and tan δ at 25° C. of a film alone obtained by final curing of this coating was 3.2 GPa and 0.14, respectively.

(Formation of Organic/Inorganic Composite Layer (C))

A silsesquioxane compound "COMPOCERAN SQ107" having a thiol group (available from Arakawa Chemical Industries, Ltd.) was used as the silsesquioxane (c2). A coating was prepared by adding 12.5 g of triallyl isocyanurate "TAIC" (available from Nippon Kasei Chemical Co., Ltd.), 0.07 g of an initiator "IRGACURE 184" (available from BASF) and 56.3 g of propylene glycol monomethyl ether to 31.1 g of COMPOCERAN SQ107 and then sufficiently stirring the mixture. This coating was applied to the laminate (B2) obtained above using a wire bar, followed by drying at 80° C. for 90 seconds and then irradiation of ultraviolet ray of 600 mJ/cm², thereby completely curing the coating together with the lower layer (B2) to obtain a laminate (C2) having an about 3 μm organic/inorganic composite layer (C).
(Formation of Inorganic Layer (D))

An aerosol deposition (AD) device having a usual construction and provided with a film formation chamber, an aerosol chamber, a vacuum pump and a carrier gas generator was used. Further, for formation of the inorganic layer (D), aluminum oxide powder was used. The powder was subjected to drying treatment at 120° C. to 250° C. as treatment (3) whether there is a growth of crack on the inorganic layer (D) due to an external stimulus by dropping of alcohol, and
(4) whether there is white turbidity or a growth of crack due to stimulus by grinding.

The results are shown in Table 1. An alcohol test shown in Table 1 is a test conducted to evaluate a strength of a film since in the case where a film formed by an AD method does not have a desired strength, crack is generated at a portion where a liquid such as alcohol is dropped.

TABLE 1

| | Plastic substrate (A) | Stress relaxing layer (B) | Organic/ inorganic composite layer (C) | Film thickness (μm) | Generation of initial crack | Generation of crack in alcohol test | Generation of crack in grinding test | Generation of turbidity in grinding test |
|---|---|---|---|---|---|---|---|---|
| Ex. 1 | PC | XSR-5N | E102B | 4-5 | No | No | No *1 | No |
| Ex. 2 | PC | XSR-5N | SQ107 | 6.4 | No | No | No | No |
| Com. Ex. 1 | PC | XSR-5N | — | 1-3 | No | Yes | Yes | Yes |
| Com. Ex. 2 | PC | — | E102B | 2-3 | Yes | *2 | *2 | *2 |

PC: Polycarbonate
XR-5N: Acrylic ultraviolet-curable coating
XSR-5N E102B: COMPOCERAN E102B
SQ107: COMPOCERAN SQ107
*1 In the grinding test, film peeling was generated, but no crack was generated.
*2 The test was not carried out since initial crack was generated.

before the film formation, and an inorganic material layer was formed at room temperature using the dried aluminum oxide powder to prepare a sample. In the film formation, dry air was introduced into the aerosol chamber at a flow rate of 3 to 5 liter/min to generate aerosol in which aluminum oxide fine particles were dispersed. A laminate (D2) was obtained on the laminate (C2) by an AD method under the above-mentioned conditions.

(Comparative Example 1) Laminate Comprising No Hardened Organic Polymer Layer (B)

An organic/inorganic composite layer was formed on a polycarbonate sheet (A1) (available from Teijin Limited, thickness: 2 mm) under the same conditions as in the case of the above formation of the laminate (C1) to obtain a laminate (C1'). An inorganic layer was formed on this laminate under the same conditions as in the case of the above formation of the laminate (D1) to obtain a laminate (D1').

(Comparative Example 2) Laminate Comprising No Organic/Inorganic Composite Layer (C)

A laminate (B2') provided with about 10 μm coating was obtained under the same conditions as in the case of production of the laminate (B1) except that a solid content of a coating used was limited to an acrylic ultraviolet-curable coating XSR-5N (available from Arakawa Chemical Industries, Ltd.). A storage elastic modulus at 25° C. of an obtained film alone was 1.2 GPa and tan δ thereof was 0.18. An inorganic layer was formed on this laminate under the same conditions as in the case of the above formation of the laminate (D1) to obtain a laminate (D2').
(Evaluation of Laminate)

For the laminates produced in the above Examples 1 and 2 and Comparative Examples 1 and 2:
(1) whether the inorganic layer (D) has a proper target thickness (about 5 μm),
(2) whether an initial crack after the film formation occurs on the inorganic layer (D), As shown in Table 1, since the laminates of Comparative Examples 1 and 2 were not provided with a hardened organic polymer layer or an organic/inorganic composite layer, when an inorganic layer is formed, etching occurred, and a film could not be formed or crack was generated on the aluminum oxide AD film (inorganic layer) immediately after the film formation. Meanwhile, in the laminates of Examples 1 and 2, there was no initial crack and no growth of crack was seen even in the alcohol test. Further, in the laminates of Examples 1 and 2, no white turbidity occurred and the laminate was dense. Here, when no crack was generated, it means that adhesion to a substrate is high. Furthermore, fine crack lowers a density, and white turbidity occurs by light scattering resulting from low density in a film. Therefore, when white turbidity does not occur and crack is not generated, it means that density in the film is high.

INDUSTRIAL APPLICABILITY

The laminate of the present invention is useful for glazing glass replacing inorganic glass, hard coat for various cases basically formed from a resin, hard coat for improving scratch resistance of a transparent resin plate and the like. Therefore, the present invention is suitable in the fields of a car chassis, safety parts, glass, casing and display surface of a mobile phone and the like.

EXPLANATION OF SYMBOLS

11 Chamber
12 Base
13 Laminate
14 Rotary pump
15 Gas cylinder
16 Inorganic material
17 Aerosol generator
18 Nozzle

The invention claimed is:

1. A laminate comprising
a plastic substrate (A);
a hardened organic polymer layer (B) provided on a surface of the plastic substrate (A) and having a storage elastic modulus of from 0.01 to 5 GPa and tan δ of from 0.1 to 2.0 at 25° C. which are measured at a temperature elevating rate of 2° C./min by a dynamic viscoelasticity test stipulated in JIS K7244 and performed at 10 Hz;
an organic/inorganic composite layer (C) provided on a surface of the hardened organic polymer layer (B) and containing covalently bound organic polymer and metal oxide nanoparticles; and
an inorganic layer (D) provided on a surface of the organic/inorganic composite layer (C) and comprising secondary particles of ceramic or metal.

2. The laminate of claim 1, wherein the hardened organic polymer layer (B) comprises a hardened photocurable resin.

3. A method of producing a laminate, the method comprising:
a step of forming, on a surface of a plastic substrate (A), a hardened organic polymer layer (B) having a storage elastic modulus of from 0.01 to 5 GPa and tan δ of from 0.1 to 2.0 at 25° C. which are measured by a dynamic viscoelasticity test at a temperature elevating rate of 2° C./min stipulated in JIS K7244 and performed at 10 Hz,
a step of forming, on a surface of the hardened organic polymer layer (B), an organic/inorganic composite layer (C) containing covalently bound organic polymer and metal oxide nanoparticles, and
a step of forming, on the organic/inorganic composite layer (C), an inorganic layer (D) comprising secondary particles of ceramic or metal deposited by an aerosol deposition method.

4. The method of producing a laminate of claim 3, wherein the step of forming the organic/inorganic composite layer (C) comprises at least one of the following steps (I) to (III):
(I) a step of applying and curing a solution comprising a silane-modified polymer (c1),
(II) a step of applying and curing a reactive silsesquioxane compound (c2), and
(III) a step of applying and curing surface-reactive metal oxide nanoparticles (c3) and a photocurable resin (c4).

* * * * *